United States Patent
Livingston

(10) Patent No.: US 6,700,108 B2
(45) Date of Patent: Mar. 2, 2004

(54) MEANS FOR PROTECTING OPTICAL FOCAL PLANE SENSOR ARRAYS AGAINST EXCESSIVE IRRADIATION

(75) Inventor: Peter M. Livingston, Palos Verdes, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 0 days.

(21) Appl. No.: 10/000,619

(22) Filed: Nov. 1, 2001

(65) Prior Publication Data

US 2003/0080275 A1 May 1, 2003

(51) Int. Cl.[7] .................. G01J 1/20; G01C 21/00; H01L 27/00
(52) U.S. Cl. ................ 250/203.1; 250/201.9; 250/203.2; 250/203.6; 250/208.1
(58) Field of Search .................... 250/201.9, 203.1, 250/203.3, 203.6, 208.1, 216, 203.2; 356/121

(56) References Cited

U.S. PATENT DOCUMENTS

| | | |
|---|---|---|
| 5,198,607 A | 3/1993 | Livingston et al. |
| 5,559,322 A | 9/1996 | Jacoby et al. |
| 5,729,285 A * | 3/1998 | Peterson et al. |
| 5,780,838 A | 7/1998 | Livingston et al. |
| 5,780,839 A | 7/1998 | Livingston |
| 5,841,125 A | 11/1998 | Livingston |
| 5,900,620 A | 5/1999 | Livingston |
| 5,918,305 A | 6/1999 | Livingston |
| 5,936,229 A | 8/1999 | Livingston |
| 5,939,706 A | 8/1999 | Livingston |
| 5,955,724 A | 9/1999 | Livingston |
| 5,973,309 A | 10/1999 | Livingston |
| 6,014,922 A | 1/2000 | Livingston |
| 6,021,975 A | 2/2000 | Livingston |
| 6,066,842 A | 5/2000 | Livingston |
| 6,093,923 A * | 7/2000 | Vock et al. |
| 6,145,784 A | 11/2000 | Livingston |
| 6,153,871 A | 11/2000 | Livingston |

* cited by examiner

*Primary Examiner*—David Porta
*Assistant Examiner*—David C. Meyer
(74) *Attorney, Agent, or Firm*—Katten Muchin Zavis Rosenman; John S. Paniaguas

(57) ABSTRACT

An imaging or viewing system, which automatically compensates for bright spots, which tend to overload or saturate imaging system. The system can be used with imaging type tracking systems, viewers and various types of optical devices which heretofore have been unable to provide satisfactory performance due to saturation or overloading of an imaging device due to bright spots, i.e., laser radiation flares or sunlight. The system in accordance with the invention is configured such that reflected radiation is imaged onto a first image plane without dividing the incoming radiation into two optical paths. A digital mirror device, i.e., is disposed at the first image plane. The radiation level of each pixel in the image plane is compared with a fixed threshold on a pixel by pixel basis and used to generate a mirror drive signal that automatically reduces the reflectivity of the corresponding mirror pixel to compensate for bright spots.

6 Claims, 2 Drawing Sheets

MEANS FOR PROTECTING OPTICAL FOCAL PLANE SENSOR ARRAYS AGAINST EXCESSIVE IRRADIATION

BACKGROUND OF THE INVENTION

1. Field of the Invention

The present invention relates to an optical system for imaging or viewing distant objects based on reflected radiation and more particularly to an optical system for use with an imaging or viewing system which automatically compensates for bright spots which can overload and/or blind focal plane sensor arrays used in such optical systems.

2. Description of the Prior Art

Various systems are known for imaging and viewing distant objects that rely on reflected radiation from a distant object. Such imaging systems are known to be used, for example, in tracking systems for tracking moving objects, such as rockets and missiles. Both imaging and non-imaging tracking systems are known. Examples of imaging tracking systems are disclosed in commonly owned U.S. Pat. Nos. 5,939,706; 5,559,322; 5,900,620; 5,918,305; 5,939,706; 5,973,309 and 6,021,975. Examples of non-imaging type tracking system are disclosed in commonly owned U.S. Pat. Nos. 5,780,838; 5,780,839; 5,936,229; 5,955,724; 6,066,842 and 6,153,871.

Such imaging-type systems typically include an imaging device, such as an electronic camera, focal plane array, or the like, for detecting and tracking the position of a targeted moving object. While such imaging systems are effective in tracking moving objects, such systems are known to have limitations when used in combination with high power laser weaponry. For example, in such systems, the high power laser beam is known to interfere with the imaging system, potentially causing a loss of track of the targeted moving object. In particular, the reflected radiation from the laser hit spot is known to blind the imaging device or cause the automatic gain control to reduce the gain to compensate for the bright laser hit spot, thereby loosing the target image.

As such, non-imaging type tracking systems have been developed. Such non-imaging tracking systems are known to use a laser beam to seek and hold on to a glint, such as a cylindrical missile-roll axis. Unfortunately, such non-imaging systems can only be used with targets when such a glint is present.

To overcome this limitation, imaging tracking devices have been developed which can compensate for reflected radiation that tend to blind or saturate the imaging device. Examples of such systems are disclosed in U.S. Pat. Nos. 5,900,620 and 5,918,305. Such systems separate the reflected radiation from the target into two paths. The first path is the radiation from the laser-hit spot. The second path is the radiation from the target or image. A micromirror array is disposed in the optical path of the reflected radiation from the target.

The intensity of the radiation falling on the focal plane in the optical train following the micromirror array creates an electrical signal output for each pixel in the focal plane array. By construction, each pixel of the micromirror array corresponds to one or a group of detector pixels. If the received radiation on the detector focal plane exceeds a preset threshold, as determined from the electrical signal output, the reflectivity of the corresponding micromirror pixel is adjusted to reduce the irradiance on the affected portion of the focal plane array. As such, any bright spots in the reflected radiation from the target are then compensated by the micromirror array and reflected to an image plane.

The radiation reflected from the laser hit spot is directed to another image plane, at which a focal plane detector array is located. The location of the laser hit spot from the focal plane array is co-registered with the imaging array to form a self-referencing type imaging tracker device, which compensates for bright spots resulting from radiation reflected from a laser hit spot.

Commonly owned U.S. patent application, Ser. No. 09/687,754, filed on Oct. 13, 2000, relates to an anti-laser viewer. The '754 patent application includes an optical system for separating radiation from a laser hit spot from the target information and providing separate imaging devices for both the target scene as well as the hit spot. The anti-laser viewer also includes a micromirror which compares the instant radiation at each pixel with a threshold level and automatically controls the reflectivity of the micromirror such that the intensity reflected by each pixel is within a desired threshold, thus compensating for bright spots in the reflected radiation from the target. Similar to the '305 and '620 patents, mentioned above, the anti-laser viewer relies on super-imposing the laser hit spot image on the target. Unfortunately, the anti-laser viewer, as well as the imaging type tracking systems disclosed in the '620 and '305 patents, require fairly complicated optics for compensating for bright spots in the reflected radiation from a distant object. In particular, these systems require a polarizing beam splitter, narrow band pass filters, a quarter wave plate and a micromirror assembly as well as multiple imaging planes. These multiple imaging planes must be co-registered to enable an image of the laser-hit spot to be superimposed on the image of the target and thus require relatively precise alignment. Thus, there is a need for a relatively simple device for protecting imaging devices from overload or saturation which does not require splitting incoming radiation into multiple optical paths and is relatively simple, has few components, and does not require precise alignment of components.

SUMMARY OF THE INVENTION

The present invention relates to an optical system for use with an imaging or viewing system, which automatically compensates for bright spots, which tend to overload or saturate imaging system, such as a focal plane array. The system can be used with imaging type tracking systems, viewers and various types of optical devices which heretofore have been unable to provide satisfactory performance due to saturation or overloading of an imaging device due to bright spots, such as laser radiation flares or sunlight. The system in accordance with the invention is configured such that the reflected radiation is imaged onto a first image plane without dividing the incoming radiation into two optical paths. A digital mirror device, for example, is disposed at the first image plane. The radiation level of each pixel in the image plane is compared with a fixed threshold on a pixel by pixel basis and used to generate a mirror drive signal that automatically reduces the reflectivity of the corresponding mirror pixel to compensate for bright spots.

DESCRIPTION OF THE DRAWINGS

These and other objects of the present invention will be readily understood with reference to the following specification and attached drawing wherein.

DETAILED DESCRIPTION

Figure 1A:
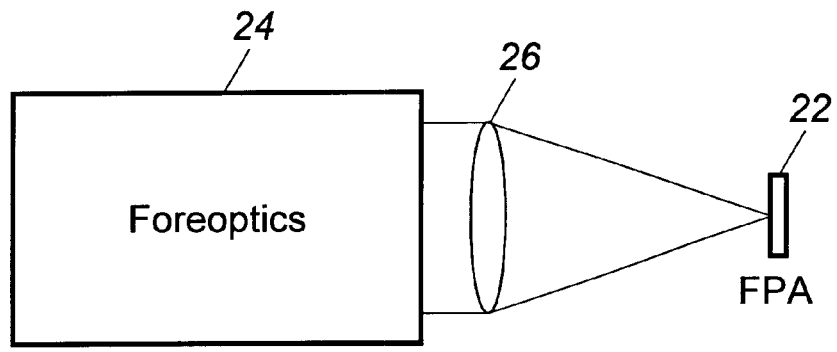
FIG. 1A is a block diagram of a prior art imaging/viewing system that includes a focal plane array.
Figure 1B:
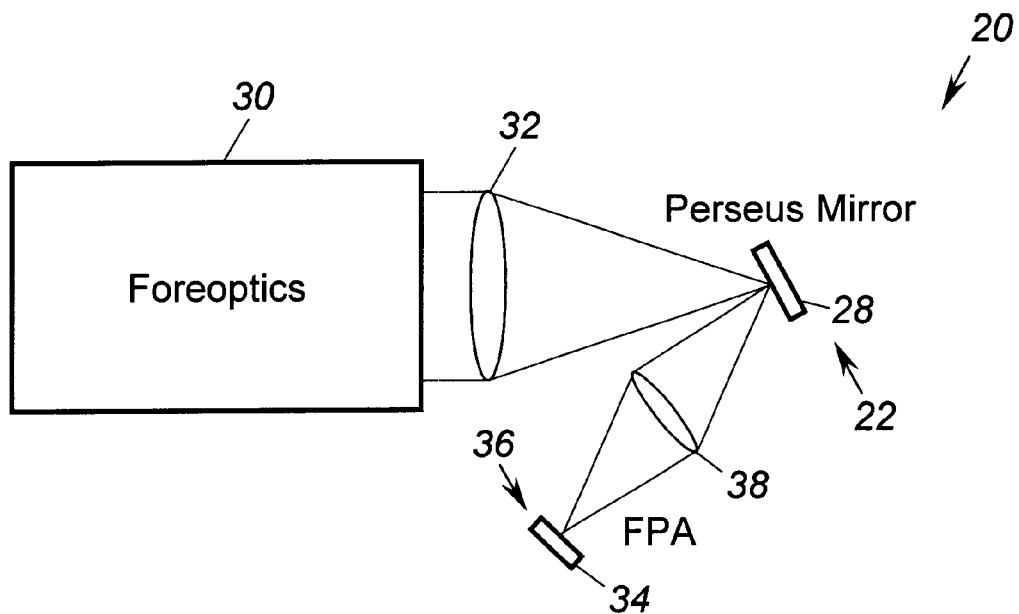
FIG. 1B is a block diagram of the optical system in accordance with the present invention.

The present invention relates to an optical system for imaging and viewing distant objects by way of reflective radiation, which automatically compensates for bright spots in the reflected radiation to prevent overloading of imaging systems, such as focal plane arrays, typically used in such optical systems. A simplified diagram of the optical system is illustrated in FIG. 1(*b*) and identified with the reference numeral 20. FIG. 1(*a*) illustrates a conventional optical system. As shown in FIG. 1(*a*), radiation reflected from an object is focused at an image plane 22 by way of a conventional foreoptics system 24 and an imaging lens 26. As discussed above, bright spots in the radiation can overload or saturate a focal plane array (FPA) located at the image plane 22. In order to solve this problem, the present invention utilizes a so-called Perseus mirror 28 located at the image plane 22. The optical system 20 further includes conventional foreoptics 30 for collecting radiation reflected from an object, and an imaging lens 32. Radiation from a distant object is focused onto an image plane by way of the foreoptics 30 and the imaging lens 32. The Perseus mirror 28, may be implemented as a digital mirror device (DMD), for example, a Fleximirror™, manufactured by Texas Instruments, commonly found in theater video projectors or a liquid crystal device useful in visible light applications. The reflectivity of such mirrors is adjustable on a pixel by pixel basis. Radiation reflected from a distant object is compared on a pixel by pixel basis with a fixed threshold. Any pixels whose intensity exceed the fixed threshold, result in mirror drive signals being generated for darkening mirror elements that correspond to those pixels to automatically compensate for bright spots in radiation reflected from a distant target.

In accordance with an important aspect of the present invention, a focal plane array 34 or liquid crystal display is located at a second image plane 36. Radiation, from the Perseus mirror 28 is imaged onto the second image plate and thus the focal plane array 34 by way of an imaging lens 38. Since the Perseus mirror 28 compensates for bright spots in the reflected radiation, the radiation reflected to the focal plane array 34 will not saturate or overload the device.

Figure 2:
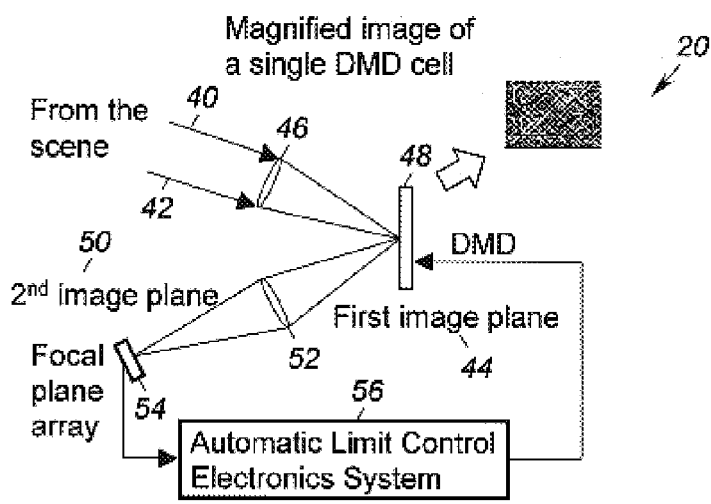
FIG. 2 is a more detailed diagram of the optical system illustrated in FIG. 1B.

A more detailed blocked diagram of the optical system 20 in accordance with the present invention is illustrated in FIG. 2. As shown, the arrows 40 and 42 indicate radiation reflected from a distant target (not shown). This radiation may be collected by conventional foreoptics 30, as mentioned above, which may consists of conventional collection optics, such as a telescope (not shown), and imaged onto a first imaging plane 44 by way of a imaging lens 46. A digital mirror device (DMD), for example, is located at the first image plane 44. As discussed above, the reflectivity of the digital mirror device 48 can be controlled on a pixel by pixel basis. The radiation from the digital mirror device 48 is directed to a second image plane 50 by way of another imaging lens 52. A focal plane array 54 or liquid crystal display or other similar device is located at the second image plane. The pixel by pixel output signals from the focal plane array 54 are directed to an automatic limit control system 56, which forms a closed feedback loop and generates a mirror drive signals to drive the individual pixel elements of the digital mirror device 48.

Figure 3:
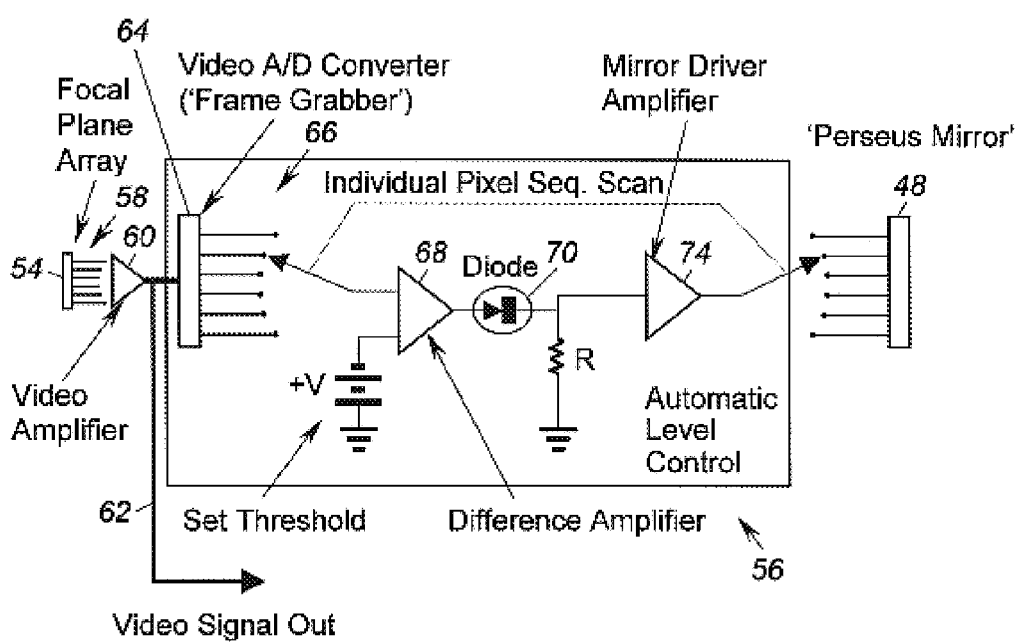
FIG. 3 is a block diagram of an automatic level of control circuit for use with the present invention.

A detailed schematic of an exemplary automatic limit control system 56 is illustrated in FIG. 3. As shown, the pixel by pixel output signals, generally identified by the reference numeral 58, from the focal plane array 54, may be amplified by a conventional video amplifier array 60. The output of the video amplifier array 60 is a "Video Signal Out", signal indicated by the line 62. The output of the video amplifier array 60 is applied to the automatic limit control circuit, shown within the box 56, in FIG. 3. The automatic limit control system 56 includes a microcontroller (not shown), for example, a Pentium™ or better based microcontroller, with onboard memory, a video analog/digital (A-D) converter 64, which acts as a frame grabber, and a digital to analog (D/A) converter. The output lines of the video A/D converter 64 represent the individual intensity values for the pixel elements of the focal plane array 54 and are collectively identified with the reference numeral 66. Under the control of the microcontroller, the pixel output lines 66 are sequentially scanned, multiplexed and converted back to an analog value by way of a (D/A) digital/analog converter, which may be on board the microcontroller.

The individual analog pixel output signals are sequentially applied to a non-inverting input of a difference amplifier 68, for example, by a multiplexer (not shown) under the control of the microcontroller. An analog voltage +V is applied to an inverting input of the difference amplifier 68. The analog voltage +V represents a threshold level. Thus, anytime a pixel output signal exceeds a threshold, the voltage difference is dropped across a resistor R, connected to the output of the difference amplifier 68 by way of a diode 70. This voltage across the resistor R is applied to a mirror driver amplifier 74, which is sequentially connected to the digital mirror device 48, for example, by way of a demultiplexer (not shown), under the control of the microcontroller. The output of the mirror driver amplifier 74 thus generates a mirror drive signal, which causes the individual pixel mirror elements in the digital mirror device 48 to adjust the reflectivity of the individual mirror elements as a function of the voltage appearing across the resistor R. During a condition when the pixel output signal 66 of the focal plane array 54 exceeds the threshold, the mirror drive signal causes the respective pixel mirror element to reduce its reflectivity.

Obviously, many modifications and variations of the present invention are possible in light of the above teachings. Thus, it is to be understood that, within the scope of the amended claims, the invention may be practiced otherwise than as specifically described above.

We claim:

1. An optical system for receiving reflected radiation from an object; the optical system comprising:

a collection optics system for collecting radiation reflected from an object and directing all of said reflected radiation to a first image plane;

a digital mirror device disposed at said first image plane, said digital mirror device having a plurality of individually controllable pixel elements whose reflectivity is a function of a drive signal applied thereto;

an imaging lens disposed adjacent to the first image plane for imaging all said radiation at a second image plane;

an imaging device disposed at a second image plane, said imaging device including pixel elements;

an automatic limit control system coupled to said individual pixel elements in said imaging device and said digital mirror device forming a closed feedback loop of said individual pixel elements;

a mirror drive amplifier for adjusting the reflectivity of said individual pixel elements as a function of the value of said mirror drive signals.

2. The optical system as recited in claim 1, wherein said automatic limit control system includes a difference amplifier for comparing the intensity values of said individual pixel elements with a predetermined threshold value and generating individual pixel mirror drive signals as a function of the difference therebetween.

3. The optical system as recited in claim 1, wherein said imaging device is a focal plane array.

4. The optical system as recited in claim 1, wherein said automatic limit control system includes a video A/D converter for converting the output signals from said imaging device to digital signals.

5. The optical system as recited in claim 1, further including an array of video amplifiers coupled to said individual pixel elements of said imaging device.

6. A method for protecting an imaging device from saturation, the method comprising the steps of:

(a) collecting radiation reflected from an object;

(b) directing all of said reflected radiation to a digital mirror device at a first image plane;

(c) reflecting the radiation at said digital mirror device to an imaging device at a second image plane; and (d) controlling the reflectivity of said digital mirror device on a pixel by pixel basis such that the individual pixel intensity values of said digital mirror devices are less than a predetermined value.

* * * * *